United States Patent [19]

Stephenson et al.

[11] Patent Number: 4,881,778

[45] Date of Patent: Nov. 21, 1989

[54] VEHICLE SEAT ASSEMBLY WITH AUTOMATICALLY MOVABLE ARM REST

[75] Inventors: Robert L. Stephenson, Orchard Lake; Harvey R. Rumpel, Plymouth, both of Mich.

[73] Assignee: Hoover Universal, Inc., Ann Arbor, Mich.

[21] Appl. No.: 232,216

[22] Filed: Aug. 15, 1988

[51] Int. Cl.[4] ............................................. A47C 7/54
[52] U.S. Cl. ................................... 297/417; 297/421; 297/378
[58] Field of Search ............... 297/417, 421, 378, 459

[56] References Cited

U.S. PATENT DOCUMENTS

| | | | |
|---|---|---|---|
| 974,703 | 11/1910 | Parr | 297/417 |
| 1,743,802 | 1/1930 | Andress | 297/417 |
| 3,778,103 | 12/1973 | Edwards | 297/359 |
| 4,141,586 | 2/1979 | Goldner et al. | 297/417 |
| 4,351,562 | 9/1982 | Twitchell et al. | 297/378 |
| 4,400,033 | 8/1983 | Pietsch | 297/417 |
| 4,496,190 | 1/1985 | Barley | 297/417 |

*Primary Examiner*—Francis K. Zugel
*Attorney, Agent, or Firm*—Harness, Dickey & Pierce

[57] ABSTRACT

An adjusting mechanism is disclosed for automatically raising the arm rest of a vehicle front seat assembly when the seat back is tilted forward to permit ingress to and egress from the back seat of a two door motor vehicle. In one embodiment a solid link is attached to the arm rest and to the seat cushion to exert an upward force on the arm rest as the seat back is moved forward. In two other embodiments, a cable attached to the arm rest and to the seat cushion is provided which exerts an upward force on the arm rest as the tension in the cable increases when the seat back is rotated forward. In one embodiment, a spring is used to maintain the tension in the cable at a predetermined level.

1 Claim, 3 Drawing Sheets

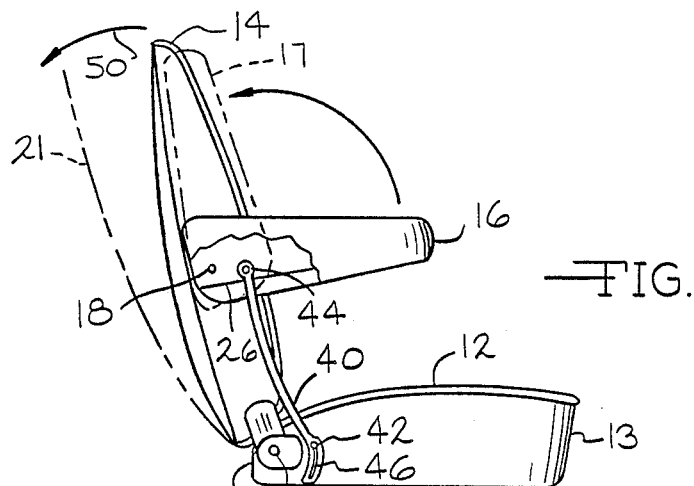
FIG. 5
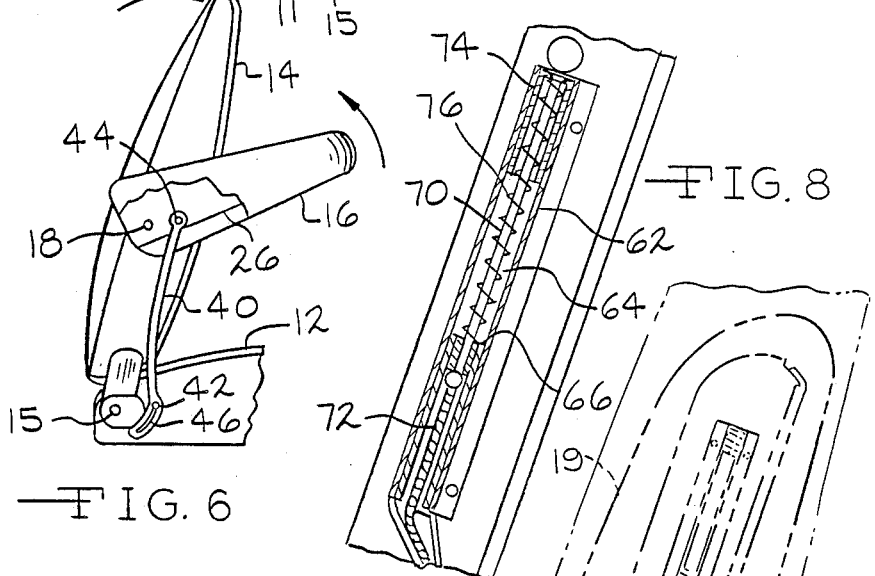
FIG. 6
FIG. 8
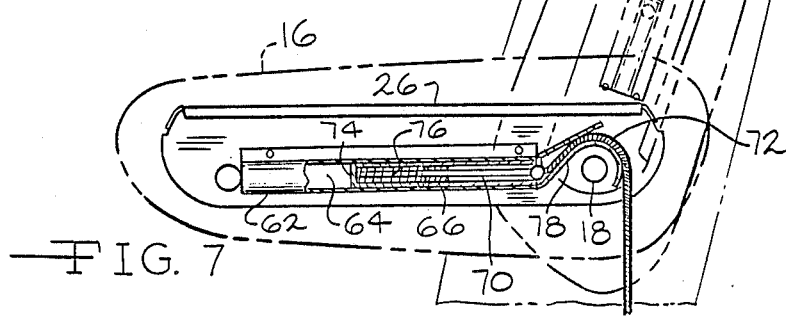
FIG. 7

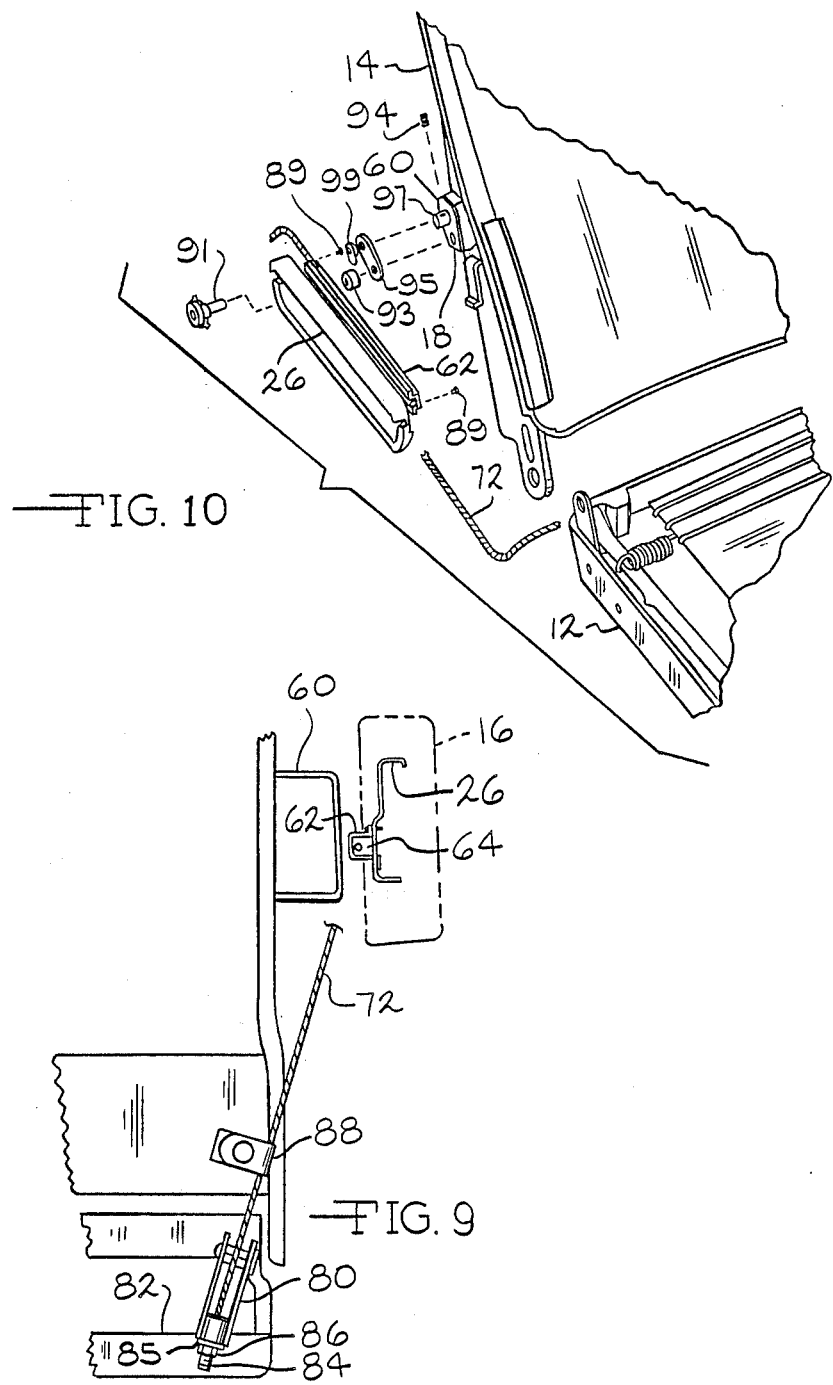

VEHICLE SEAT ASSEMBLY WITH AUTOMATICALLY MOVABLE ARM REST

BACKGROUND OF THE INVENTION

This invention relates to automotive seat assemblies having arm rests which are pivotally mounted to the seat back and seat backs which can be rotated forward, or dumped, to provide access to the area behind the seat. More particularly, this invention relates to a mechanism for moving the arm rest to a position along side the seat back in response to forward rotation of the seat back.

Seats which dump forward are used in a number of applications. These include front seats in two door automobiles, rear seats in station wagons, and pickup trucks and utility vehicles with storage space behind the seats. Certain vehicles, primarily pick-up trucks and other utility vehicles, are often equipped with large bucket seats frequently referred to as captain's chairs. Such a seat often includes an arm rest attached to the seat back on one or both sides of the seat back. These arm rests are hinged to the seat back to allow the arm rest to be rotated upward along the side of the seat back and out of the way for passengers entering the vehicle.

A problem with arm rests attached to the seat back is that if the arm rests are not moved upward, the arm rest may interfere with other interior vehicle components as the seat back is dumped. This can limit the amount of tilting of the seat back, thus reducing the access to the area behind the seat.

The outboard arm rest typically does not present a problem as the occupant will raise this arm rest to the upper position before leaving the vehicle to dump the seat back. The inboard arm rest, however, is frequently left in the horizontal position thus limiting the tilting of the seat back.

Accordingly, it is an object of this invention to provide a seat assembly for a motor vehicle in which the arm rest is automatically rotated along the side of the seat back when the seat back is dumped forward.

SUMMARY OF THE INVENTION

In one embodiment, the arm rest is automatically moved by a cable which is attached to the seat cushion and arm rest such that when the seat back is rotated forward, the tension in the cable is increased creating a moment about the arm rest pivot to rotate the arm rest upward relative to the seat back.

In a second embodiment, a spring is used to maintain the tension in the cable at or above a predetermined level to prevent slack in the cable.

In a third embodiment, a solid link is attached to the side of the seat cushion, forward of the seat back pivot and to the arm rest, forward of the arm rest pivot. The arm rest, link, seat cushion and seat back thus form a four bar linkage. As the seat back is dumped, the link causes the arm rest to rotate relative to the seat back. The arm rest can be manually raised along the side of the seat back when the seat back is in its upright position. This is accomplished by providing a slot in the link at its lower end such that the link can be pulled upward as the arm rest is manually moved.

Further objects, features and advantages of the invention will become apparent from a consideration of the following description and the appended claims when taken in connection with the accompanying drawings.

BRIEF DESCRIPTION OF THE DRAWINGS

FIG. 5 is a side elevation view of the seat assembly containing an automatic arm rest adjusting mechanism which utilizes a solid link;

FIG. 6 is a side elevation view of the seat assembly of FIG. 5 showing the seat back in the dumped position;

FIG. 7 is a broken away fragmentary side elvation view of the seat assembly of FIG. 2 with a cable adjust mechanism employing a spring to maintain tension in the cable;

FIG. 8 is a side view of the spring tension device of FIG. 7 with the arm rest in the manually raised position along the side of the seat back;

FIG. 9 is a rear elevation view of the seat assembly having the arm rest adjusting mechanism of FIG. 7;

FIG. 10 is an exploded perspective view of the seat assembly of FIG. 9.

DETAILED DESCRIPTION OF THE INVENTION

Figure 1:
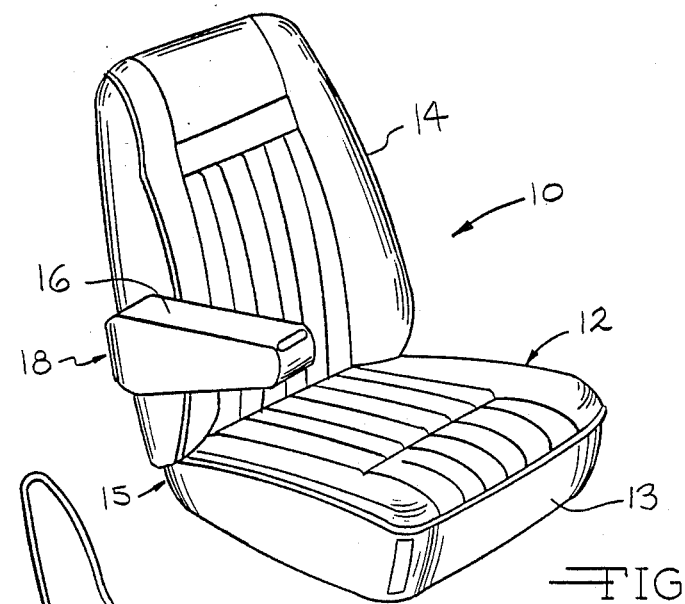
FIG. 1 is a perspective view showing the seat assembly with the automatic arm rest adjusting mechanism of this invention.

Referring now to the drawings, in FIG. 1 one form of a seat assembly 10 is shown embodying the principles of this invention. Seat 10 contains a lower seat cushion 12 having a front end 13 and rear end 11. Mounted to the rear end 11 of cushion 12 is a seat back 14. The lower end of seat back 14 is pivotally mounted to the seat cushion by a back pivot member 15. Extending forward from the seat back along its side between the lower and upper end thereof is an arm rest 16. Arm rest 16 extends forward in a generally horizontal operative position. Arm rest 16 is pivotally mounted to seat back 14 by an arm pivot member 18. To prevent the arm rest 16 from interfering with other vehicle components as the seat back is dumped from an upright position to a forwardly inclined position, the arm rest is pivoted upwardly to a position along the side of the seat back. The arm rest can be pivoted manually upward by the vehicle occupant if so desired. To avoid an interference between the arm rest and other components when dumping the seat back if the vehicle occupant forgets to raise the arm rest, a mechanism to automatically raise the arm rest in response to the forward motion of the seat back is provided and described below.

Figure 2:
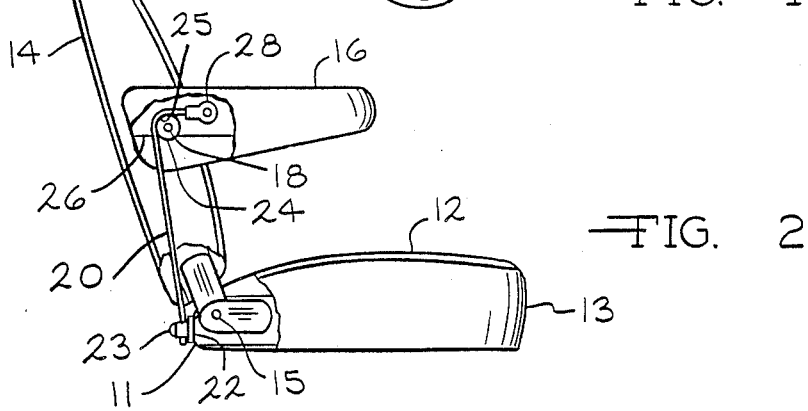
FIG. 2 is a side elevation view of the seat assembly of FIG. 1 partially cut away to show a form of the automatic arm rest adjusting mechanism that utilizes a cable.

One mechanism to automatically lift the arm rest is shown in FIG. 2 where a portion of the arm rest and seat upholestery is cut away to show the lift mechanism. One end of a cable 20 is attached to the frame 22 of seat cushion 12 by an anchor member 23. The member 23 is located rearward of back pivot member 15. Cable 20 passes behind and over cam plate 24 around arm pivot member 18 and is attached to arm rest frame 26 by an attaching member 28. Cam plate 24 includes an arcuate surface 25 spaced radially from pivot member 18. Attachment 28 is above and forward of pivot 18. The location of attachment 23 rearward of back pivot member 15 results in cam action of the cable moving over the surface of cam plate 24 as the seat back is tilted forward. When the seat back is tilted forward, the tension in cable 20, acting on arm rest frame 26 through attachment 28, creates a counterclockwise moment about arm pivot member 18 which will rotate the arm rest 16 upward relative to the seat back.

Figure 3:
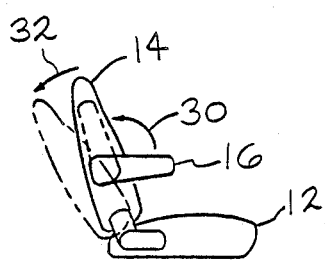
FIG. 3 is a side view of the seat assembly of FIG. 1 showing the seat back in a reclined position in broken lines and the manually lifted position of the arm rest also in broken lines.
Figure 4:
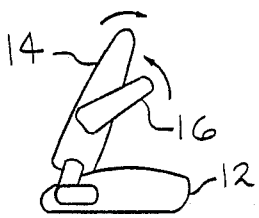
FIG. 4 is a side view of the seat assembly like FIG. 3 showing the seat back in a forwardly dumped position and the resulting lifted position of the arm rest.

Cable 20 will permit manual rotation of arm rest 16 to the position shown with broken lines in FIG. 3 while the seat back 14 is in the upright position. This motion is shown by arrow 30. Additionally, cable 20 permits seat back 14 to be reclined rearward as shown by arrow 32 to the position shown in broken lines.

When seat back 14 is dumped about pivot member 15, the distance between cable attachment 23 and the point of cable contact with cam 24 increases. This causes arm rest 16 to rotate relative to seat back 14. As the arm rest rotates, the length of cable in contact with the cam decreases to compensate for the increased distance from anchor 23 to cam 24.

Referring now to FIGS. 5 and 6, another embodiment of the automatic arm rest lift mechanism of this invention is shown. In this embodiment, a link 40 is attached to seat cushion 12 by a pin 42 and to arm rest 16 by a pin 44. Pins 42 and 44 extend through apertures at each end of the link 40. The link 40, seat cushion 12, seat back 14 and arm rest 16 cooperate to form a four bar linkage. Pins 42 and 44 are located forward of pivot members 15 and 18 respectively. When the seat back 14 is rotated forward about the back pivot 15, the link 40 exerts an upward force on the arm rest 16 creating a counterclockwise moment about pivot 18 to rotate arm rest 16 upward.

The aperture in link 40 at pin 42 includes a slot 46 which enables the arm rest 16 to be manually raised when seat back 14 is in the upright position as shown by arrow 48 and the broken line 17. In addition, slot 46 allows seat back 14 to be tilted rearward as shown by arrow 50 and broken line 21.

A variation of the cable actuated arm rest embodiment shown in FIGS. 1-4 is shown in FIGS. 7 through 10. In this variation, a spring is used to maintain the tension on the cable. Mounted to arm rest frame 26, is a "C" channel 62 which, when attached to frame 26, defines a hollow spring guide 64. Fixed within the spring guide is a stop 66 having a center opening through which extends a secondary cable 70 attached at one end to the primary cable 72. The opposite end of cable 70 is attached to a hollow sliding block 74 which slides within spring guide 64. Coil spring 76 surrounds cable 70 within spring guide 64 and is compressed by movement of sliding block 74 toward pivot 18.

The secondary cable 70 has a slightly smaller diameter than primary cable 72. This allows for easy movement of the secondary cable within the spring guide. A single cable could be used or, alternatively, a metal rod could be used in place of the secondary cable.

The sliding block 74 at the radially outer end of secondary cable 70 is used primarily to engage one end of spring 76 for compression of the spring. Other fittings may be used at the end of cable 70 for engaging the spring 76.

Cable 72 wraps around a cam plate 78 about pivot member 18 and extends downward to cable anchor 80 mounted to seat cushion frame 82 as shown in FIG. 9. Cable 72 includes a threaded bolt 84 at its end which is used to adjust the cable length during assembly of the seat. Bolt 84 extends through an aperture in the anchor plate 85 attached to seat cushion frame 82 and is held in place by nut 86. A cable guide 88 is attached to the seat back 14 to ensure that the cable 72 is routed properly as the seat back moves forward.

When the seat back is in the upright position and the arm rest in the horizontal position as shown in FIG. 7, the sliding block 74 is in contact with stop 66 and and spring 76 is at maximum compression. As the seat back 14 is moved forward from this position, the tension in cable 72 creates a clockwise moment about pivot 18 as seen in FIG. 7. This moment causes arm rest 16 to rotate relative to the seat back 14 toward a position along side the seat back.

Arm rest 16 can also be manually rotated to a position along side upright seat back 14 as shown by broken lines 19 in FIG. 7. In this position, the sliding block 74 is moved to the end of spring channel 64 away from pivot member 18 by spring 76 as shown in FIG. 8. Spring 76 is used in this manner to maintain the tension in cable 72 at a predetermined level to avoid slack in cable 72.

FIGS. 9 and 10 illustrates the details of the arm rest assembly. Screws 89 are used to attach the "C" channel 62 to the arm rest frame 26 forming the hollow spring guide 64. Bolt 91 attaches the arm rest frame 26 to pivot point 18 through the spacer ring 93 and plate 95. Spacer 99 and plate 95 are mounted to stud 97 by set screw 94 to provide a positioning stop to support the arm rest 16 in a generally horizontal position extending from seat back 14 when the seat back is in the upright position.

As can be seen, either a cable or a link can be used to provide a means whereby the arm rest is moved from its operative position extending forward from the seat back to a position along side the seat back. The arm rest is moved in response to forward motion of the seat back from an upright position to a forwardly inclined position. This is accomplished by the cable or the link creating a moment about the arm rest pivot to rotate the arm rest relative to the seat back. In addition, both the cable and link allow the arm rest to be manually raised along side the upright seat back and allow the seat back to be reclined rearward.

It is to be understood that the invention is not limited to the exact construction or method illustrated and described above, but that various changes and modifications may be made without departing from the spirit and scope of the invention as defined in the following claims.

What is claimed is:

1. A seat assembly for a motor vehicle comprising:
   a seat cushion having front and rear ends;
   a seat back having upper and lower ends and extending upwardly in an upright position from said seat cushion adjacent said rear end thereof, means pivotally supporting the lower end of said seat back on said seat cushion such that said seat back can be pivotally moved forwardly from said upright position toward a forwardly inclined position;
   an arm rest having a forward end and a rearward end, an arm rest pivot member pivotally connecting the rearward end of said arm rest to said seat back at a position between said upper and lower ends of said seat back, said arm rest having an operative position extending forwardly from said seat back and said arm rest being pivotable from said operative position to a raised position along side said seat back;

means operatively associated with said arm rest for pivotally raising said arm rest from said operative position toward said raised position as said seat back is pivoted from an upright position toward said forwardly inclined position, said raising means including cam means adjacent said arm rest pivot member, said cam means having an arcuate cam surface above and rearward of said arm rest pivot member, and a cable attached at one end to said seat cushion at a predetermined attachment point and attached at the opposite end to said arm rest at a position forwardly of said cam means and said arm rest pivot member, said cable extending over and behind said cam surface and engaging said cam surface at a location rearwardly of said arm rest pivot member, said one end of said cable being attached to said seat cushion at a location relative to said seat back pivotal support means such that as said seat back is pivoted from said upright position toward said forwardly inclined position, the distance between said predetermined cable attachment point and the location of engagement of said cable with said cam surface is increased, thereby increasing tension in said cable, said opposite end of said cable being attached to said arm rest at a location such that the tension in said cable acts upon said arm rest to create a moment about said arm rest pivot member in a direction to pivot said arm rest from said operative position toward said raised position and spring means operatively associated with said cable for maintaining sufficient tension in the cable to avoid slack in the cable when said arm rest is in said raised position.

* * * * *